United States Patent
Kim et al.

(10) Patent No.: US 8,301,924 B2
(45) Date of Patent: Oct. 30, 2012

(54) APPARATUS AND METHOD FOR A POWER CONTROL IN A SYSTEM USING AN EMBEDDED CPU

(75) Inventors: Tae-Jin Kim, Siheung-si (KR);
Jung-Hun Park, Yongin-si (KR);
Hyuk-Chan Park, Suwon-si (KR);
Ho-Seung Lee, Seoul (KR); Kang-Min Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 437 days.

(21) Appl. No.: 12/587,826

(22) Filed: Oct. 14, 2009

(65) Prior Publication Data
US 2010/0095141 A1 Apr. 15, 2010

(30) Foreign Application Priority Data
Oct. 15, 2008 (KR) .................. 10-2008-0101088

(51) Int. Cl.
*G06F 1/32* (2006.01)

(52) U.S. Cl. ...................................... 713/320
(58) Field of Classification Search ................... 713/320
See application file for complete search history.

(56) References Cited

U.S. PATENT DOCUMENTS
7,058,824 B2 * 6/2006 Plante et al. .................. 713/300
* cited by examiner

*Primary Examiner* — Paul R Myers
*Assistant Examiner* — Jeremy S Cerullo

(57) ABSTRACT

A portable communication apparatus is configured to perform a method for power control of a Central Processing Unit (CPU) in a portable communication apparatus. The portable communication apparatus for power control of the CPU includes a CPU configured to report an operation status of the CPU and an overhead determiner. The CPU is also configured to change a power control level according to control of the overhead determiner. The overhead determiner is configured to determine an overhead of the CPU and to control the power control level of the CPU based on the overhead of the CPU.

20 Claims, 4 Drawing Sheets

APPARATUS AND METHOD FOR A POWER CONTROL IN A SYSTEM USING AN EMBEDDED CPU

CROSS REFERENCE TO RELATED APPLICATION(S) AND CLAIM OF PRIORITY

The present application is related to and claims the benefit of priority under 35 U.S.C. §119(a) to a Korean patent application filed in the Korean Intellectual Property Office on Oct. 15, 2008 and assigned Serial No. 10-2008-0101088, the entire disclosure of which is hereby incorporated by reference.

TECHNICAL FIELD OF THE INVENTION

The present invention relates to an apparatus and a method for a system using an embedded Central Processing Unit (CPU), and more particularly, to an apparatus and a method for power control in a system using the embedded CPU.

BACKGROUND OF THE INVENTION

A long battery life is important for current portable communication apparatuses. Thus, research is conducted for increasing a battery capacity and for low power consumption in order to extend the battery life of the portable communication apparatuses.

An embedded system used in the portable communication apparatus is usually a software-based system. Current consumptions of a Central Processing Unit (CPU), which executes the software, and a memory are relatively important in the portable communication apparatus.

Therefore, the portable communication apparatus dynamically controls current during an operation of the CPU in order to reduce current consumption of the embedded system, i.e., when the CPU is in standby mode, the portable communication apparatus reduces the current consumption by lowering a clock of the CPU.

Meanwhile, when the CPU is in the operation mode, the portable communication apparatus provides a current to the CPU in order to supply the clock normally. The portable communication apparatus may minimize the current in the embedded system by using dynamic clock scaling and dynamic voltage scaling.

That is, the portable communication apparatus supplies a high clock or a high voltage when the portable communication apparatus operates fast and the portable communication apparatus supplies a low clock or a low voltage when the portable communication apparatus operates slowly. By doing this procedure, the portable communication apparatus may minimize power consumption.

As set forth above, the portable communication apparatus is required to determine an overhead of the system exactly in order to reduce power consumption. Thus, a technology is required to determine the overhead of the system exactly and to control power consumption according to the determination.

SUMMARY OF THE INVENTION

To address the above-discussed deficiencies of the prior art, it is a primary aspect of the present invention to provide an apparatus and a method for power control in a system using an embedded CPU.

Another aspect of the present invention is to provide an apparatus and a method for power control by considering an overhead of an embedded CPU in a system using the embedded CPU.

Yet another aspect of the present invention is to provide an apparatus and a method for power control in phases by considering an overhead of an embedded CPU in a system using the embedded CPU.

Still yet another aspect of the present invention is to provide an apparatus and a method for power control by considering an overhead of an embedded CPU in a portable communication apparatus using the embedded CPU.

In accordance with another aspect of the present invention, a method for power control of a Central Processing Unit (CPU) in a portable communication apparatus is provided. The method for power control of a CPU in a portable communication apparatus includes comparing a time that a CPU has been operating in operation mode continuously with a maximum operation time of the CPU when a clock edge occurs, determining whether an overhead determination period of the CPU has arrived when the time that the CPU has been operating in operation mode continuously is shorter than the maximum operation time of the CPU, determining an overhead of the CPU when the overhead determination period of the CPU has arrived and changing a power control level according to the overhead of the CPU.

In accordance with an aspect of the present invention, a portable communication apparatus for power control of a CPU is provided. The portable communication apparatus for power control of a CPU includes a CPU and an overhead determiner. The CPU is configured to report an operation status of the CPU and change a power control level according to a control of an overhead determiner by using a pin. The overhead determiner is configured to determine an overhead of the CPU by using the pin and configured to control the power control level of the CPU according to the overhead of the CPU.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any apparatus, system or part thereof that controls at least one operation, such a apparatus may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Hereinafter, an apparatus and method for power control by considering an overhead of an embedded CPU in a system using the embedded CPU will be described.

The present invention assumes power control by considering the overhead of the embedded CPU in the system using the embedded CPU in a portable communication terminal. Herein, an internal system structure of the portable communication apparatus is illustrated as FIG. 1.

Figure 1:
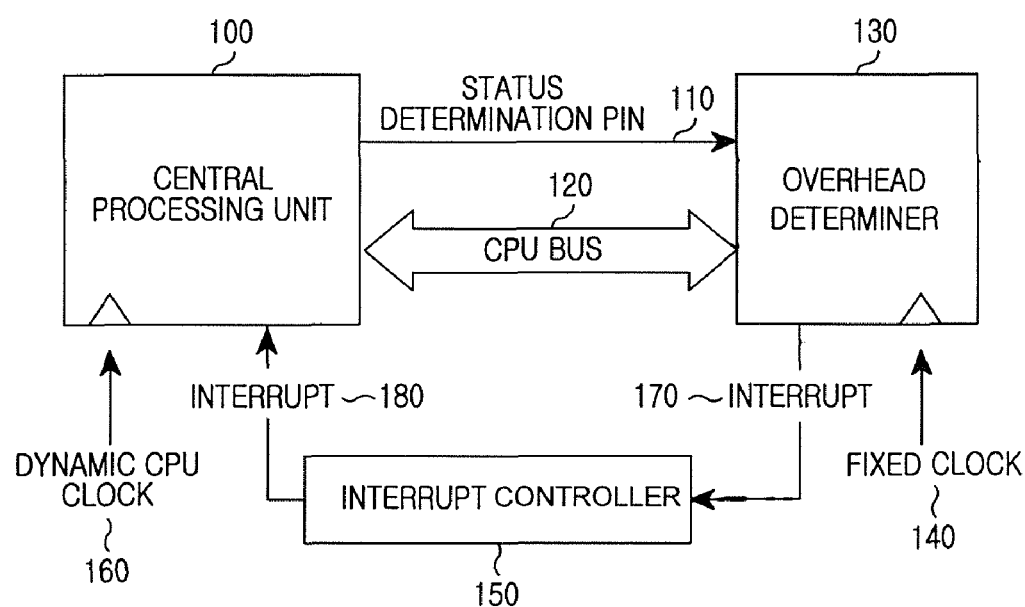
FIG. 1 illustrates an internal system structure of a portable communication apparatus according to an exemplary embodiment of the present invention.

FIG. 1 illustrates an internal system structure of a portable communication apparatus according to an exemplary embodiment of the present invention.

Referring to FIG. 1, the internal system in the portable terminal comprises a CPU 100, a status determination pin 110, a CPU bus 120, an overhead determiner 130 and an interrupt controller 150. Herein, the CPU 100 may be comprised as an embedded CPU.

The CPU 100 notifies an operation status of the CPU 100 to the overhead determiner 130 through the status determination pin 110. Also, the CPU 100 controls the overhead determiner 130 through the CPU bus 120 or determines an operation status of the overhead determiner 130 through the CPU bus 120.

The overhead determiner 130 can determine an overhead of the CPU 100 per a fixed clock 140 according to the fixed clock 140. Herein, the overhead determiner 130 determines whether to change a power of the CPU 100 by considering the overhead of the CPU 100.

When the power of the CPU 100 is changed, the overhead determiner 130 can transmit power change time point information to the interrupt controller 150 using an interrupt 170, i.e., when the power of the CPU 100 is changed, the overhead determiner 130 transmits the interrupt 170 to the interrupt controller 150. Hereafter, the interrupt controller 150 transmits the power change time point information to the CPU 100 using an interrupt 180. The CPU 100 performs a clock change operation or a voltage change operation in the determined power change time point determined by using the interrupt 180. The overhead determiner 130 is illustrated in FIG. 2.

Figure 2:
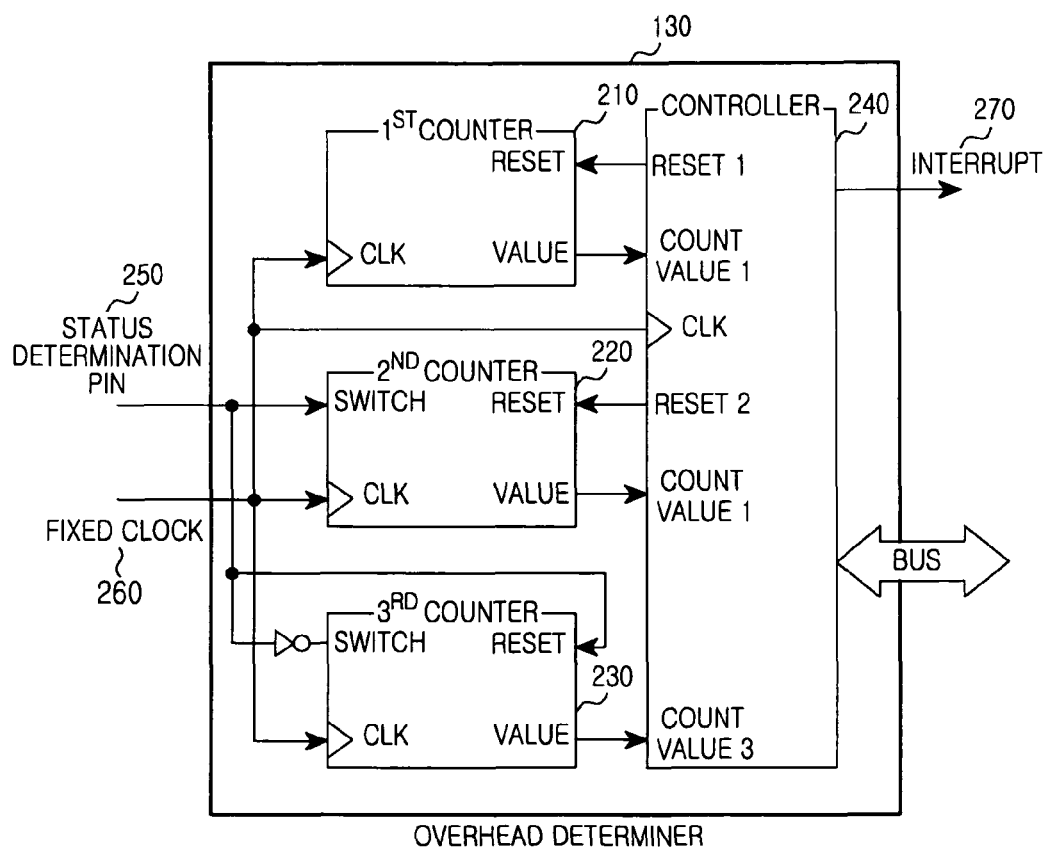
FIG. 2 illustrates an internal system structure of an overhead determiner in a portable communication apparatus according to an exemplary embodiment of the present invention.

FIG. 2 illustrates an internal system structure of an overhead determiner in a portable communication apparatus according to an exemplary embodiment of the present invention.

Referring to FIG. 2, the overhead determiner 130 comprises a counter_1 210, a counter 2_220, a counter_3 230, a controller 240 and a status determination pin 250. Herein, the counter_1 210, counter_2 220 and counter_3 230 operate according to a fixed clock 260.

The counter_1 210 provides period information for determining, by the overhead determiner 130, the overhead of the CPU 100 through a counting value according to the fixed clock 260. Thus, the counting value of the counter_1 210 is initialized per a period for determining, by the overhead determiner 130, the overhead of the CPU 100.

The counter_2 220 receives an input, provided from the status determination pin 250, at a switch and determines an operation status of the CPU 100. The counter_2 220 performs a counting only when the status of the CPU 100 is in standby mode. Herein, the counter_2 220 initializes a counting value together when a counting value of the counter_1 210 is initialized.

The counter_3 230 can receive inverted information of an input at a switch and operate using the inverted information. Thus, the counter_3 230 performs a counting when the status of the CPU 100 is in operation mode according to an input of a status determination pin 250. Herein, the counter_3 230 initializes a counting value when the operation status of the CPU 100 is in standby mode.

The controller 240 can determine the overhead of the CPU 100 by considering the counting values provided from the counter_1 210, the counter_2 220 and the counter_3 230. Herein, the controller 240 determines whether to change the power of the CPU 100 by considering the overhead of the CPU 100.

Figure 3:
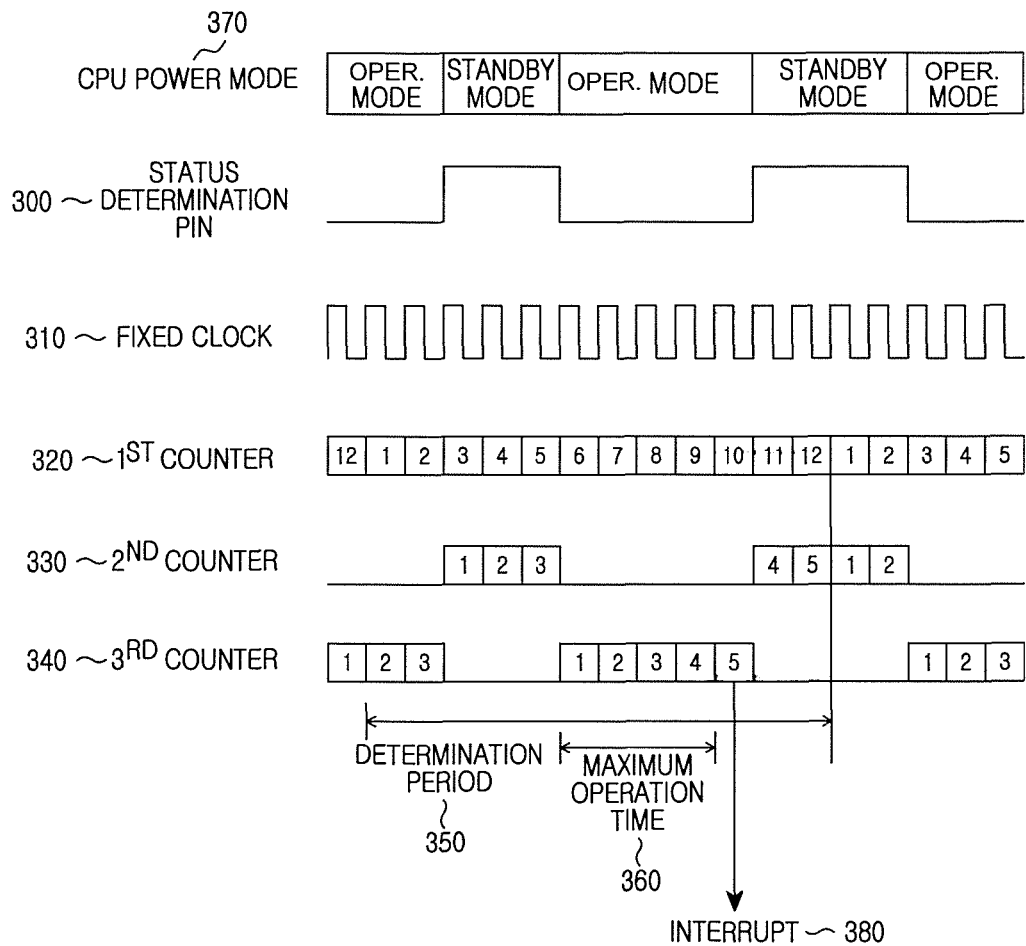
FIG. 3 illustrates an operation method of a counter included in an overhead determiner according to an exemplary embodiment of the present invention.

When the change of the power of the CPU 100 is determined, the controller 240 generates an interrupt 270 and transmits the interrupt 270 to the CPU 100, i.e., the counter_1 210, the counter_2 220 and the counter_3 230 operate as shown in FIG. 3.

FIG. 3 illustrates an operation method of a counter included in an overhead determiner according to an exemplary embodiment of the present invention.

Referring to FIG. 3, a counter_1 320 can determine a determination period ($T_c$) 350 by counting according to a fixed clock 310, i.e., when the determination period ($T_c$) 350 is set to '12', the controller 240 determines an overhead determination period of the CPU 100 has arrived and determines the overhead of the CPU 100 when a counting value of the counteri 320 is set to '12'. Herein, the counter_1 320 initializes the counting value when the counting value of the counter_1 320 is '12'.

The counter_2 330 can perform a counting according to the operation status information provided from a status determination pin 300, i.e., the counter_2 330 can perform counting only when the CPU 100 is in standby mode. Herein, the counter_2 330 initializes a counting value of the counter_2 330 when the counteri 320 initializes the counting value of the counter_1 320.

The counter_3 340 can perform counting only when the status of the CPU 100 is in operation mode in order to determine whether a maximum operation time 360 has been reached. When a counting value of the counter_3 340 is longer than the maximum operation time 360, the controller 240 can determine that the overhead of the CPU 100 is increased instantly and generate an interrupt 380 for the CPU 100 to transition to a maximum current level. The counter_3

340 initializes the counting value of the counter_3 340 when the CPU 100 is not in operation mode.

As set forth above, the controller 240 can determine the overhead of the CPU 100 when the counting value of the counter_1 320 denotes an arrival of the overhead determination period. Herein, the controller 240 may determine the overhead of the CPU 100 by using Equation 1:

$$L = \left(\frac{T_c - N_{c\_2}}{T_c}\right) \times 100 \quad [\text{Eqn. 1}]$$

In Equation 1, the L denotes the overhead of the CPU 100 and the $T_c$ denotes a period to determine the overhead of the CPU 100. The $N_{c\_2}$ denotes the counting value of the counter_2 330.

The controller 240 can determine a power control level of the CPU 100 according to the overhead of the CPU 100 per the determination period ($T_c$) 350, i.e., the controller 240 can define the power control level of the CPU 100 according to a pattern of a communication modem terminal below.

Level 1: a status which has almost no traffic Hyper Text Transfer Protocol (HTTP) communication.

Level 2: watch a low bit rated Video On Demand (VOD)/a simplex File Transfer Protocol (FTP).

Level 3: a duplex FTP communication (FTP Up/Down)/ watch a high bit rated VOD.

Level 4: a case in which much calculation may be required as a network entry/a maximim traffic communication.

A condition for the CPU 100 to transition the power control level can depend upon a performance of a communication modem. That is, a condition of the CPU 100 to step up/down the power control level can depend on the performance of the communication modem.

According to this, the controller 240 can be required to find a transition condition variable for the power control level of the CPU 100 according to the performance of the communication modem, i.e., in the case of the communication modem terminal, a user of the communication modem terminal uses a web browser using HTTP. Thus, the controller 240 can define a use pattern for using the web browser to be level 1 and set the use pattern as the transition condition.

The controller 240 can determine a traffic quantity for a use pattern of the communication modem in order to determine a transition condition variable for the power control level corresponding to the communication modem.

Thereafter, the controller 240 can determine the transition condition variable for the power control level by determining the overhead of the CPU 100 corresponding to the determined traffic quantity. That is, when the communication traffic is increased, a share rate of the CPU 100 is increasing. Thus, the controller 240 can define the power control level of the CPU 100 according to the traffic quantity.

Meanwhile, the share rate of the CPU 100 may increase according to auxiliary processes such as an authentication, a handover and a network entry. Herein, the CPU 100 should complete the auxiliary processes within a specific time. Thus, the controller 240 defines a processing duration for the auxiliary processes in the CPU 100. The processing duration will be referred to as a timing critical section.

When the controller 240 transitions to the timing critical section, the controller 240 sets a CRITICAL_SECTION Flag and transitions the CPU 100 to a maximum current level. Also, the controller 240 stops a level shift of the overhead determiner 130 for power control. When the timing critical section is finished, the controller 240 resets the CRITICAL_SECTION Flag and grants the level shift of the overhead determiner 130.

According to this, a processing time of the CPU 100 in the timing critical section may be guaranteed. Herein, the CRITICAL_SECTION Flag is defined as a variable or a register.

A low level with a small level value in the power control level which is defined by the controller 240 denotes a frequency or a voltage is low and the low level is used when the share rate of the CPU is low.

When the controller 240 shifts the power level of the CPU 100 from a low level to a high level, the controller 240 shifts the power level of the CPU to the highest level. That is, because the controller 240 may not determine an exact power requirement of the CPU 100, the controller may determine an adequate level after supplying a maximum power to the CPU 100.

When the controller 240 lowers the power level of the CPU 100, the controller 240 does not lower the power level of the CPU 100 directly when a condition is satisfied. The controller 240 lowers the power level of the CPU 100 after a specific protection time in order to detect a pattern of the CPU 100.

That is, when the pattern is maintained for the specific protection time, the controller 240 estimates that the CPU 100 is used continuously according to the pattern and the controller 240 controls the power control level of the CPU 100 to be lowered.

Hereafter, a description for controlling the power level of the CPU 100 according to the overhead of the CPU 100 in the controller 240 of the overhead determiner 130 will be disclosed.

Figure 4:
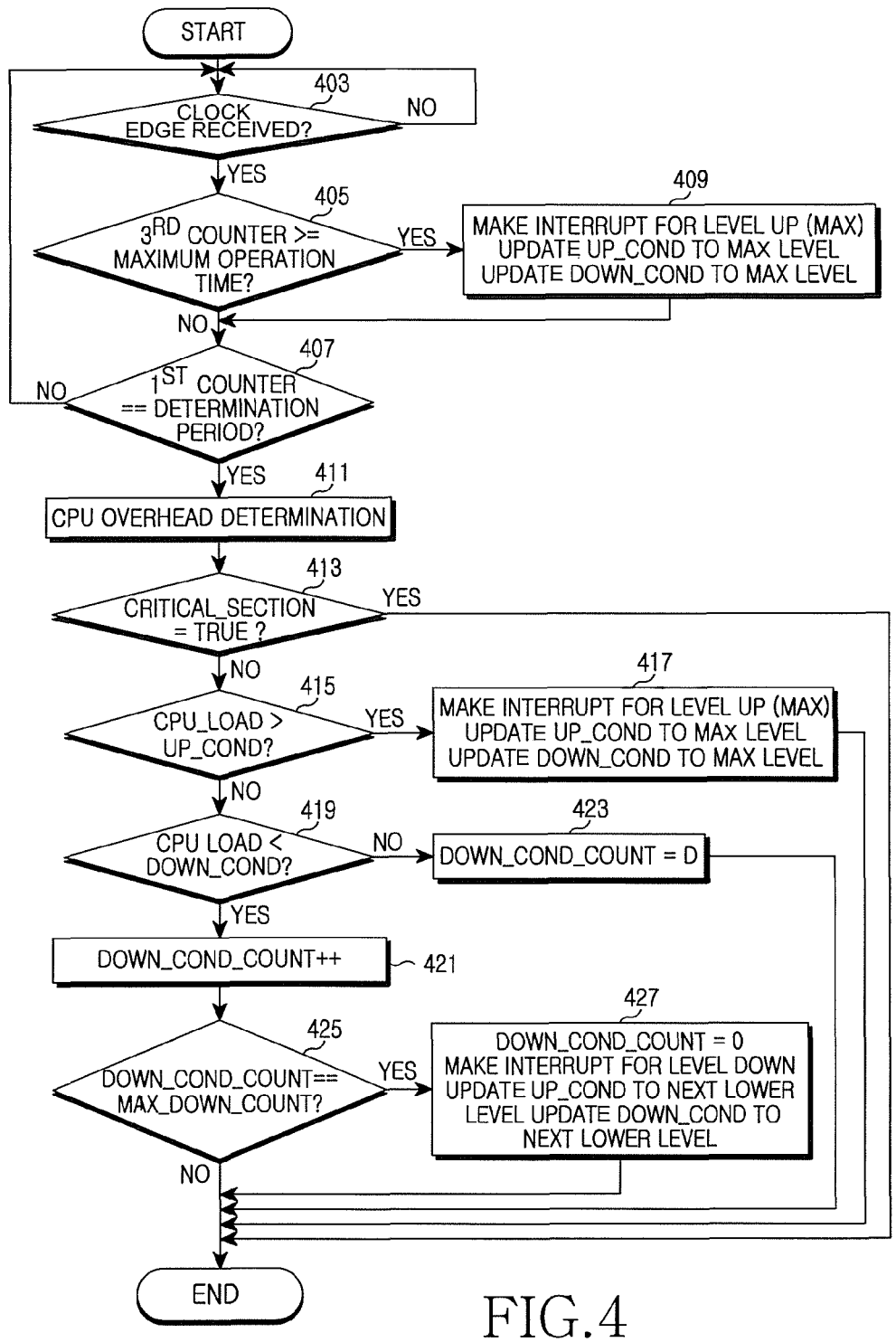
FIG. 4 illustrates a flowchart for determining an overhead of a CPU in a portable communication apparatus according to an exemplary embodiment of the present invention.

FIG. 4 illustrates a flowchart for determining an overhead of a CPU in a portable communication apparatus according to an exemplary embodiment of the present invention.

Referring to FIG. 4, the controller 240 can determine whether a clock edge has been received in step 403, i.e., the controller 240 determines whether an edge of a fixed clock signal has been received. When a clock edge has not been received, the controller 240 can determine substantially continuously whether a clock edge has been received in the step 403.

When a clock edge has been received, the controller 240 can compare the counting value of the counter_3 340 with the maximum operation time 360 in step 405.

When the counting value of the counter_3 340 is longer than or equal to the maximum operation time 360, the controller 240 determines the overhead of CPU 100 should be increased instantly. In this example, the controller 240 generates an interrupt for the CPU 100 to transition to a maximum current level in step 409.

Hereafter, the controller 240 can determine whether the counting value of the counter_1 320 is identical to the determination period 350 in step 407.

When the counting value of the counter_3 340 is shorter than the maximum operation time 360 in the step 405, the controller 240 can determine whether the counting value of the counter_1 320 is identical to the determination period 350 in step 407.

When the counting value of the counter_1 320 is not identical to the determination period 350, the controller 240 returns to the step 403.

When the counting value of the counter_1 320 is identical to the determination period 350, the controller 240 determines the overhead of the CPU 100 in step 411, i.e., the controller 240 can determine the overhead of the CPU 100 using Equation 1. At this time, the controller 240 resets the counting values of the counter_1 320 and the counter_2 330.

The controller 240 determines whether the CPU 100 has transitioned to a timing determination section in step 413 after determining the overhead of the CPU 100 in step 411.

When the CPU 100 has transitioned to a timing determination section in step 413, the controller 240 ends the process without granting a voltage level change.

When the CPU 100 has not transitioned to a timing determination section in step 413, the controller 240 determines whether the overhead of the CPU 100 which is determined in step 411 satisfies a condition for transitioning the CPU 100 to a higher level in step 415.

When the overhead of the CPU 100 satisfies the condition for transitioning the CPU 100 to a higher level, the controller 240 generates an interrupt for the CPU 100 to transition to the maximum current level in step 417. Also, the controller 240 updates up/down conditions of corresponding levels to maximum values each. Herein, the up condition of the corresponding level denotes a condition for transitioning to a higher level and the down condition of the corresponding level denotes a condition for transitioning to a lower level.

Hereafter, the controller 240 ends the process.

When the overhead of the CPU 100 does not satisfy the condition for transitioning the CPU 100 to a higher level in step 415, the controller 240 can determine whether the overhead of the CPU 100 satisfies the condition for transitioning the CPU 100 to a lower level in step 419.

When the overhead of the CPU 100 satisfies the condition for transitioning the CPU 100 to a lower level, the controller 240 can update a counter to transition the CPU 100 to a lower level in step 421.

Hereafter, the controller 240 can determine whether a counting value of the counter to transition the CPU 100 to a lower level is identical to a maximum counting value out of counting values which satisfies a condition for transitioning the CPU 100 to a lower level in step 425.

When the counting value of the counter to transition the CPU 100 to a lower level is identical to the maximum counting value out of counting values which satisfies the condition for transitioning the CPU 100 to a lower level in step 425, the controller 240 can generate an interrupt to lower the level of the CPU 100 in step 427.

Hereafter, the controller 240 can reset the counter to transition the CPU 100 to the lower level. Also, the controller 240 can update levels, corresponding to the up/down conditions, to desired levels each. Hereafter, the controller 240 ends the process.

When the condition for transitioning the CPU 100 to a lower level is not satisfied in step 419, the controller 240 can reset the counter to transition the CPU 100 to a lower level in step 423. Hereafter, the controller 240 ends the process.

The counter to transition the CPU 100 to a lower level is activated in order to detect a use pattern of the CPU 100 when the condition to transition the CPU 100 to a lower level is satisfied. That is, when the pattern is maintained for a specific time, the controller 240 expects the CPU 100 to be used continuously according to the use pattern and the controller 240 controls the power control level of the CPU 100 to be lowered.

The overhead determiner 130 can be implemented as software and an operation method of a software-based overhead determiner is identical to that of the overhead determiner 130.

Also, the counters 210, 220 and 230 included in the overhead determiner 130 can be implemented by using timers, and the counters 210, 220 and 230 can be used for operations to determine each level.

As set forth above, the present invention has an advantage for implementing an efficient low power consumption system with power control in phase by considering an overhead of an embedded CPU in a system using the embedded CPU.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for power control of a Central Processing Unit (CPU) in a portable communication apparatus, the method comprising:
   increasing a power control level of the CPU in response to the CPU being continuously in an operation mode longer than a maximum operation time; and
   determining whether to change the power control level of the CPU based on an overhead of the CPU in response to elapse of a single overhead determination period after elapse of an immediately preceding overhead determination period.

2. The method of claim 1, further comprising:
   tracking, with a first counter, a count of clock edges received through a fixed clock signal;
   determining that the single overhead determination period has elapsed when the count of the first counter reaches a first threshold; and
   initializing the count of the first counter when the single overhead determination period has elapsed.

3. The method of claim 2, further comprising:
   tracking, with a second counter, a count of clock edges received through the fixed clock signal while the CPU is continuously in the operation mode;
   determining that the CPU has been continuously in the operation mode longer than the maximum operation time when the count of the second counter reaches a second threshold; and
   initializing the second counter when the CPU is in a standby mode.

4. The method of claim 3, further comprising:
   tracking, with a third counter, a count of clock edges received through the fixed clock signal while the CPU is in the standby mode;
   determining the overhead of the CPU based on a length of the single overhead determination period and the count of the third counter; and
   initializing the third counter when the single overhead determination period has elapsed.

5. The method of claim 1, further comprising:
   increasing the power control level of the CPU to a maximum level in response to the CPU being continuously in an operation mode longer than a maximum operation time;
   determining whether the single overhead determination period has elapsed after raising the power control level of the CPU to the maximum level; and
   when a determination is made to change the power control level of the CPU based on the overhead of the CPU and the change is to increase the power control level, increasing the power control level of the CPU to the maximum level.

6. The method of claim 1, further comprising changing the power control level of the CPU by generating an interrupt signal for the CPU.

7. The method of claim 1, further comprising determining the overhead of the CPU by calculating a percentage of the single overhead determination period during which the CPU is in the operation mode.

8. The method of claim 1, further comprising:
determining whether a condition for decreasing the power control level of the CPU based on the overhead of the CPU has been satisfied for a reference time; and
decreasing the power control level of the CPU by one step when the condition for decreasing the power control level is satisfied for the reference time.

9. The method of claim 1, further comprising;
determining whether an auxiliary process is in progress; and
ending a procedure for changing the power control level when the auxiliary process is in progress.

10. The method of claim 1, wherein the power control level is determined according to a use pattern of the portable communication apparatus.

11. A portable communication apparatus for power control of a Central Processing Unit (CPU), the portable communication apparatus comprising:
a CPU configured to report an operation status of the CPU, wherein the operation status is one of an operation mode and a standby mode; and
an overhead determiner configured to:
receive the operation status of the CPU,
increase a power control level of the CPU in response to the CPU being continuously in the operation mode longer than a maximum operation time, and
determine whether to change the power control level of the CPU based on an overhead of the CPU in response to elapse of a single overhead determination period after elapse of an immediately preceding overhead determination period.

12. The portable communication apparatus of claim 11, wherein the overhead determiner is further configured to operate using a fixed clock.

13. The portable communication apparatus of claim 11, the overhead determiner comprising:
a first counter configured to track a count of clock edges received through a fixed clock signal;
a second counter configured to track a count of clock edges received through the fixed clock signal while the CPU is in the standby mode;
a third counter configured to track a count of clock edges received through the fixed clock signal while the CPU is continuously in the operation mode; and
a controller configured to determine the overhead of the CPU based on the count of the first counter and the count of the second counter, to control the power control level of the CPU based on the overhead, to initialize the count of the first counter and the count of the second counter when the single overhead determination period has elapsed, and to initialize the count of the third counter when the CPU is in the standby mode.

14. The portable communication apparatus of claim 13, wherein the controller is further configured to raise the power control level to a maximum level when the count of the third counter is longer than or equal to the maximum operation time of the CPU.

15. The portable communication apparatus of claim 13, wherein the controller is further configured to determine the single overhead determination period has elapsed based on the count of the first counter.

16. The portable communication apparatus of claim 13, wherein the controller is further configured to determine, when the count of the first counter reaches a first threshold, the overhead of the CPU based on a length of the single overhead determination period and the count of the second counter.

17. The portable communication apparatus of claim 13, wherein the controller is further configured to raise the power control level of the CPU to a maximum level when the overhead of the CPU satisfies a condition for increasing the power control level.

18. The portable communication apparatus of claim 13, wherein the controller is further configured to lower the power control level of the CPU by one step when the overhead of the CPU satisfies a condition for decreasing the power control level for a reference time.

19. The portable communication apparatus of claim 13, wherein the controller is further configured to end a procedure for changing the power control level when an auxiliary process is in progress.

20. The portable communication apparatus of claim 13, wherein the controller is further configured to control the power control level of the CPU by generating an interrupt signal for the CPU.

* * * * *